United States Patent [19]

Battafarano

[11] 4,127,026

[45] Nov. 28, 1978

[54] PIPE DETECTING ARRANGEMENT FOR AN HYDROSTATIC PIPE TESTING APPARATUS

[75] Inventor: James D. Battafarano, Youngstown, Ohio

[73] Assignee: Wean United, Inc., Pittsburgh, Pa.

[21] Appl. No.: 841,766

[22] Filed: Oct. 13, 1977

[51] Int. Cl.² .................... G01M 3/28; G01M 3/02
[52] U.S. Cl. ..................................... 73/49.5; 73/49.6
[58] Field of Search ............... 73/40, 45.3, 49.1, 49.5, 73/49.6; 178/90, 91

[56] References Cited

U.S. PATENT DOCUMENTS

| | | | |
|---|---|---|---|
| 1,841,974 | 1/1932 | Naylor | 73/49.5 X |
| 2,707,876 | 5/1955 | McConnell et al. | 73/49.6 |
| 2,959,955 | 11/1960 | Pasquale | 73/49.5 X |
| 3,033,025 | 5/1962 | McConnell et al. | 73/49.6 |
| 3,064,467 | 11/1962 | Kortenhoven | 73/49.6 |
| 3,118,546 | 1/1964 | McConnell et al. | 73/49.6 X |
| 3,350,921 | 11/1967 | Brauen et al. | 73/49.6 |
| 3,358,497 | 12/1967 | Hauk | 73/49.5 X |
| 3,460,376 | 8/1969 | Kemp | 73/49.5 |
| 3,587,294 | 6/1971 | Kost | 73/49.5 |

Primary Examiner—John Petrakes
Attorney, Agent, or Firm—Daniel Patch; Suzanne Kikel

[57] ABSTRACT

An arrangement in a testhead of an hydrostatic pipe testing apparatus for tripping a limit switch, which is connected to a control for a main hydraulic piston cylinder assembly for the testhead, upon the pipe's contact with the arrangement thereby interrupting the travel of the testhead. This tripping action is indicative that an end of the pipe is in proper engagement with a seal in the testhead prior to the introduction of the pressurized testing fluid into the interior of the pipe.

8 Claims, 2 Drawing Figures

PIPE DETECTING ARRANGEMENT FOR AN HYDROSTATIC PIPE TESTING APPARATUS

The present invention detects the position of the pipe relative to a sealing element within a testhead of a pipe testing apparatus and instantaneously stops or otherwise controls the travel of the testhead or the pipe.

In present practice, metallic pipe is tested for mechanical strength and fluid tightness or its diameter is expanded to improve the physical properties by placing the pipe between two testheads of which at least one moves inwardly toward the pipe so as to seal the pipe at or near its ends and introducing pressurized fluid, such as water into the interior of the pipe.

In order for the testing or expanding of the pipe to be performed the pipe has to be properly positioned relative to the sealing elements. To insure this positioning of the pipe it has been the practice for the operator of a pipe tester to use a rod attached to the testhead the length of the testhead cylinder stroke as an indicator of the positioning of each end of the pipe within the testhead. For instance, if the location of the seal is 1 foot inside the aperture of the testhead, and the testhead is 1 foot away from the end of the pipe, the operator may conclude that when the rod has moved 2 feet along a stationary scale that the end of the pipe is in engagement with the seal. This practice demands visual and manual attention.

Another present day practice is to use photoelectric cells as disclosed in U.S. Pat. No. 3,350,921. Because of the corrosive and contaminating water, photoelectric cells are not always reliable.

It is, therefore, an object of the present invention to overcome the above disadvantages existing in prior pipe testing machines by providing a more efficient and accurate means for detecting the pipe's position relative to the sealing elements within a testhead.

A further object of the present invention is to provide an hydrostatic pipe testing apparatus comprising: a pair of opposed testheads each having an aperture for receiving a different end of a pipe when the pipe is arranged between said testheads; a sealing element arranged within each of said apertures in a manner to establish a sealing condition of said different ends of the pipe with a different one of said sealing elements upon relative movement of the pipe and said testheads; means mounted in at least one of said testheads constructed and arranged axially inwardly of the receiving end of said one aperture with respect to its associated sealing element and displaceable by one of said different ends of the pipe on said relative movement, and movement sensitive means associated with said displaceable means for detecting the positioning of said one end of the pipe within its associated aperture.

A still further object of the present invention is to provide an arrangement for tripping a limit switch to automatically stop the travel of the testhead and/or the carriage supporting a pipe or to control them to prevent the pipe from hitting the striker plate too hard, thereby damaging the sealing elements or the machine itself.

Another object of the present invention is to provide a pipe positioning detecting arrangement to accommodate varying diameter pipes requiring only the changing of the seal packing arrangements.

These objects, as well as other features and advantages of the present invention, will be better understood and appreciated when the following description of two embodiments thereof is read along with the accompanying drawings of which:

Figure 1:
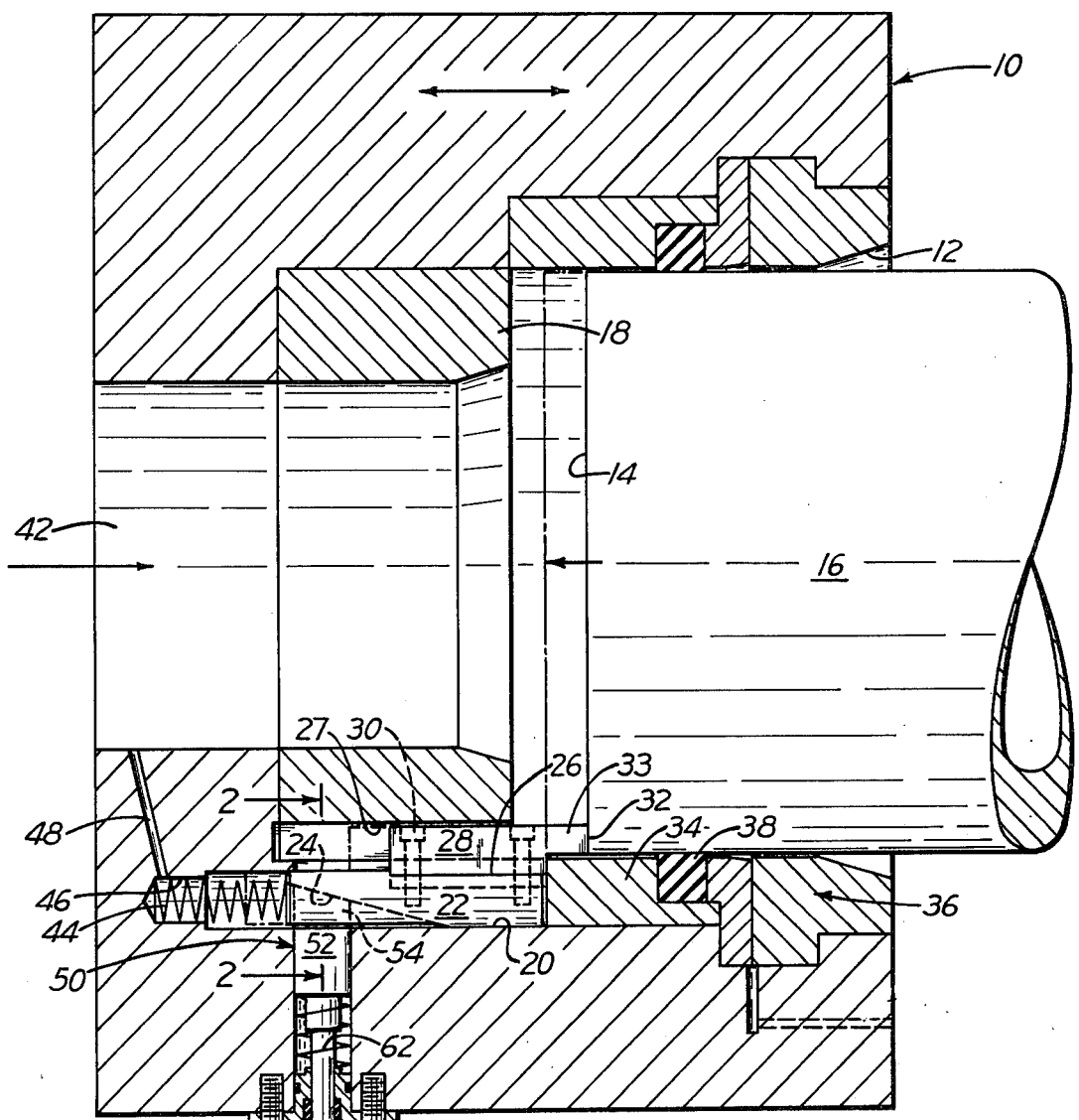
FIG. 1 is an elevational sectional view illustrating the present invention.

Referring first to FIG. 1, there is shown a design for a head stock testhead 10, having an aperture 12, for receiving an end 14 of a pipe 16. FIG. 1 actually shows two positions of this end of the pipe: one in hardline and a phantom more inward position which activates the pipe detecting device. The double arrow indicates that the testhead is reciprocated and in this particular design for a pipe tester, it is done by a double-acting hydraulic piston cylinder assembly connected to the testhead, but which is not shown. This design for a testhead is similar to that shown in the already-mentioned U.S. Pat. No. 3,350,921. Within the headstock testhead to the left of the pipe is a striker plate 18 which in the prior designs stops the pipe's travel, and in the disclosed design will accomplish this only if the headstock or pipe is not brought to a stop due to a malfunctioning of the pipe end detecting means of the present invention. Beneath the striker plate is formed a circular opening 20 for receiving a circular member or plunger 22 having an angular slot 24 which is formed inwardly from the left side of circular member 22 approximately 15° from the horizontal with respect to the bottom of the circular opening 20 and which slot 24 is centrally disposed. This is better shown in FIG. 2.

Figure 2:
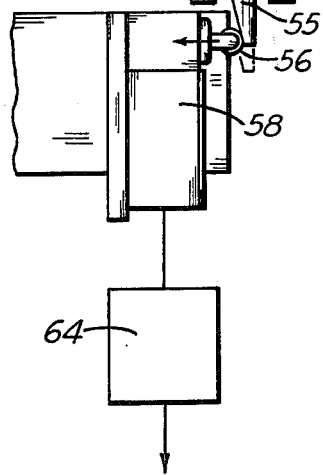
FIG. 2 is an enlarged sectional view taken along lines 2—2 of FIG. 1.
Figure 2:
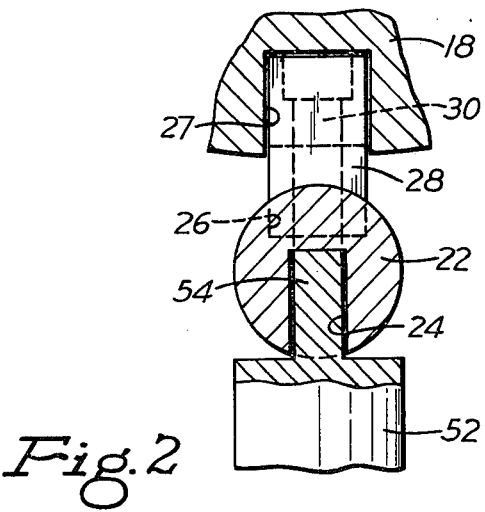

Referring to both FIGS. 1 and 2, there is illustrated in circular member 22 another slot 26 whose opening from the top receives rectangular member 28 secured by bolts 30 to circular member 22. In FIG. 1, this slot 26 is formed inwardly from the right side of circular member 22. Rectangular member 28 fits into a rectangular slot 27 of striker plate 18, and has a surface 32 for contacting the end 14 of the pipe 16. It also has a cutout portion which, in addition to other surfaces has horizontal surface 33 for contacting corresponding surfaces of a gland plate 34. Gland plate also has a cutout portion having surfaces for receiving a seal packing arrangement 36 in a manner that sealing element 38 is arranged around the O.D. of the pipe 16 when the pipe enters aperture 12. This sealing arrangement 36 can be changed to accommodate the varying diameter pipe within a certain range. The pipe detecting arrangement in the illustrated testhead is designed to accommodate pipe having an O.D. in the range of 10¾ inches to 12¾ inches. To the left of FIG. 1 is an opening 42 into which the testing fluid is introduced.

Referring particularly to FIG. 1, above angular slot 24, a part of plunger 22 contacts a spring 44 which is housed partly in opening 20 and partly in a smaller diameter opening 46 adjacent to opening 20. Above opening 46 is a channel 48 which relieves pressure from opening 46 to permit plunger 22 to return to position against gland plate 34. Below plunger 22 there is illustrated an actuator 50 consisting of a circular member 52 with an inclined portion 54 for extending perpendicularly up into angular slot 24. As better shown in FIG. 2, this inclined portion has an upper surface which corresponds to and contacts with the surface of angular slot 24. Mounted to and extending downwardly from member 52 is circular member 55, which has an inclined surface for contacting a surface of a cam roller 56 of a limit switch 58. Bolts 60 secure actuator 50 in testhead 10, and spring 62 in engagement with and mounted around member 55 forces actuator 50 back into its initial position when the pipe 16 is removed from the aperture 12 after the completion of the pipe testing operation, more about which will be explained later. To the left of, and electrically connected to limit switch 58, is a control unit 64 which has an electrical connection to the hydraulic traverse piston cylinder assembly of testhead 10, and which connection is indicated by an arrow in FIG. 1.

If pipes of a smaller O.D., ranging from 4½ inches to 8⅝ inches are to be tested, the exception to the illustrated design would be that rectangular member 28 is eliminated and circular member 22 extends through and is mounted in an opening of the striker plate. Experience has shown that this particular design works well for smaller diameter pipe, whereas, as mentioned, the design of FIGS. 1 and 2 work better for larger diameter pipes. In both the above designs passline is maintained at the bottom of the pipe, and therefore requires a different geometry of the pipe detecting assemblies. However, if passline is maintained at the centerline of the pipe, the same pipe detecting assembly can be used for all pipe sizes.

As is customary, the components of the detecting arrangements are made of bronze or stainless steel to withstand the corrosive action of the water, and Chevron (TM) packing and "O" rings are used to seal the openings against the high test pressure.

In briefly describing the operation of the invention, let us assume that one end of the pipe, which is arranged between the headstock and the tailstock testheads, is already positioned in the tailstock testhead and the headstock testhead 10 is now being advanced by its main hydraulic piston cylinder assembly (not shown) toward the other end 14 of the pipe 16. The tailstock testhead could contain a similar pipe detecting arrangement as described aforesaid. Referring particularly to FIG. 1, during the progression of the testhead's travel over the pipe by the cylinder the end 14 of the pipe 16 gradually enters aperture 12. When the pipe end 14 contacts surface 32 of rectangular member 28 it can be seen that the sealing element 38 is positioned around the outer periphery of the pipe, and members 22 and 28 are horizontally displaced a distance equal to the length of horizontal surface 33. As mentioned, the pipe position at this time is shown in phantom. This displacement, via angular slot 24 contacting inclined portion 54 of member 52 forces actuator 50 to be displaced downwardly, which, in turn, causes cam roller 56 to be displaced horizontally. This action of the roller trips limit switch 58 which transmits a signal to control unit 64 which sends a signal to interrupt the flow of fluid into the testhead's main piston cylinder assembly thereby instantaneously stopping the travel of the testhead. This tripping action of the limit switch also indicates that the end of the pipe is in proper engagement with the seal in the testhead 10. Control 64 can also be set up to instantaneously introduce pressurized fluid into the pipe through opening 42. At this time both springs 44 and 62 are compressed.

After the testing operation, testhead 10 is moved away from the pipe. Spring 44 expands to force member 22 and 28 in the opposite direction which then permits spring 62 to expand to vertically displace actuator 50 which, in turn, causes cam roller 56 to be horizontally displaced — all elements back to their initial positions as shown in the FIGURES. A limit switch is described herein; however, other electrical means, such as an electrical transducer, as well as mechanical means, can be utilized in the present invention.

By the above description it can be seen that the end of the pipe is prevented from striking against the striker place 18 thereby causing damage to the pipe testing apparatus. It is also possible to connect the limit switch to a control for controlling the travel of a carriage supporting the pipe while the testheads are advanced toward the pipe or to a control for controlling both testheads. Other types of seals such as those used at the extreme ends of the pipe and those used in the interior of the pipe can also be used.

In accordance with the provisions of the patent statutes, I have explained the principle and operation of my invention and have illustrated and described what I consider to represent the best embodiment thereof.

I claim:

1. An hydrostatic pipe testing apparatus comprising:
   a pair of opposed testheads each having an aperture for receiving a different end of a pipe when the pipe is arranged between said testheads;
   a sealing element arranged within each of said apertures in a manner to establish a sealing condition of said different ends of the pipe with a different one of said sealing elements upon relative movement of the pipe and said testheads;
   first displaceable mechanical means mounted in at least one of said testheads constructed and arranged axially inwardly of the receiving end of said one aperture with respect to its associated sealing element and displaceable by one of said different ends of the pipe on said relative movement,
   second displaceable mechanical means carried by said one testhead for engaging and transferring displacement of said first displaceable means, and
   movement sensitive means associated with said second displaceable means for operation by its displacement for detecting the positioning of said one end of the pipe within its associated aperture.

2. An hydrostatic pipe testing apparatus according to claim 1, further comprising:
   means responsive to a signal from said movement sensitive means for controlling said relative movement.

3. An hydrostatic pipe testing apparatus according to claim 1, wherein at least one said testhead further consists of:
   a striker plate located behind said associated sealing element toward the back of said aperture and having an opening for receiving said first displaceable means.

4. An hydrostatic pipe testing apparatus according to claim 1, further comprising:
   resilient means for returning said first and second displaceable means to their initial position upon a relative movement of the pipe and said testhead which tends to disrupt said positioning of said one end of the pipe relative to its opposed sealing element.

5. An hydrostatic pipe testing apparatus according to claim 4, further comprising:
   an opening formed in said one testhead for receiving said first and second displaceable means and their associated resilient means.

6. An hydrostatic pipe testing apparatus according to claim 1, wherein said first displaceable means comprises:

plunger means located parallel to the axis of said pipe and in substantial alignment with a portion of said one different end of the pipe;

wherein said second displaceable means comprises:

an actuator means located perpendicularly to said plunger means, said plunger means having an angular surface for contacting a corresponding angular surface of said actuator means whereby when said plunger means is displaced by said one different end of the pipe, said actuator means is displaced perpendicularly to said plunger means; and wherein said movement sensitive means consists of an electrical means and is operated by said displacement of said plunger means.

7. An hydrostatic pipe testing apparatus according to claim 6, wherein said actuator means consists of an upper member having said angular surface corresponding to said angular surface of said plunger means, and an elongated member having an angular surface, and wherein said electrical means comprises: a limit switch having means for transmitting a signal to said control means, and a cam roller arranged to be in constant contact with said angular surface of said elongated member and to be displaced when said plunger and actuator means are displaced, which displacement of said roller generates said signal of said limit switch.

8. An hydrostatic pipe testing apparatus comprising:

a pair of opposed testheads each having an aperture for receiving a different end of a pipe when the pipe is arranged between said testheads;

a sealing element arranged within each of said apertures in a manner to establish a sealing condition of said different ends of the pipe with a different one of said sealing elements upon relative movement of the pipe and said testheads;

first displaceable means mounted in at least one of said testheads constructed and arranged axially inwardly of the receiving end of said one aperture with respect to its associated sealing element and displaceable axially by one of said different ends of the pipe on said relative movement, second displaceable means carried by said one testhead arranged perpendicularly to said first displaceable means, and constructed to engage said first displaceable means to be displaced thereby, and movement sensitive means associated with said second displaceable means for operation of its displacement for detecting the positioning of said one end of the pipe within its associated aperture.

* * * * *